June 7, 1955  S. HOPFER  2,710,383
STANDING WAVE INDICATOR
Filed April 27, 1954  2 Sheets-Sheet 1

INVENTOR
SAMUEL HOPFER
BY Ralph B. Stewart
ATTORNEY

June 7, 1955

S. HOPFER 2,710,383

STANDING WAVE INDICATOR

Filed April 27, 1954

INVENTOR
SAMUEL HOPFER

BY Ralph B. Stewart

ATTORNEY

United States Patent Office 2,710,383
Patented June 7, 1955

2,710,383
STANDING WAVE INDICATOR

Samuel Hopfer, Brooklyn, N. Y., assignor to Polytechnic Research & Development Co., Inc., Brooklyn, N. Y., a corporation of New York Application April 27, 1954, Serial No. 425,802

7 Claims. (Cl. 333—98)

This invention relates to a device for indicating or measuring standing waves in a rectangular waveguide. The invention is especially designed for indicating standing waves in a waveguide of the "ridged" type and involving the transmission of waves within the frequency range of 10 to 40 kilo-megacycles per second.

The broad object of the invention is to devise a standing wave indicator for the measurement of standing waves over a four to one frequency band without interference from higher modes.

Another object of the invention is to devise a standing wave indicator embodying a probe movable along the length of the waveguide but without the use of a longitudinal slot in the wall of the waveguide.

In attaining the objects of my invention, a section of rectangular waveguide is formed in a circular arc or H-bend formed about an axis parallel with the E-plane, that is, parallel with the shorter transverse dimension of the waveguide. A section of one broad wall of the waveguide at the bend is constructed to rotate about the axis of the bend, and the probe of the indicator is carried by this movable wall section. By this arrangement, the joints between the movable wall section and the adjacent stationary wall sections are arranged at an angle to the longitudinal axis of the waveguide which minimizes reflection from the joints. Also, the joints are formed by cylindrical surfaces which can be accurately machined to provide a minimum clearance between the two surfaces.

By the construction just described, the pickup probe is carried by a movable wall section of the guide having its inner face arranged in the same plane as the inner faces of the adjacent stationary wall sections of the waveguide.

Another object of the invention is to devise a novel arrangement for yieldably pressing the movable wall section of the guide into contact with the bent waveguide section at different points spaced along the bend. This is accomplished by spring pressed rolls acting on the rotary wall section.

Other features of the invention include an arrangement for adjusting the insertion of the probe into the waveguide, and an arrangement embodied in the movable wall section for tuning the probe.

One suitable embodiment of the invention is illustrated in the accompanying drawing in which.

Figure 1:
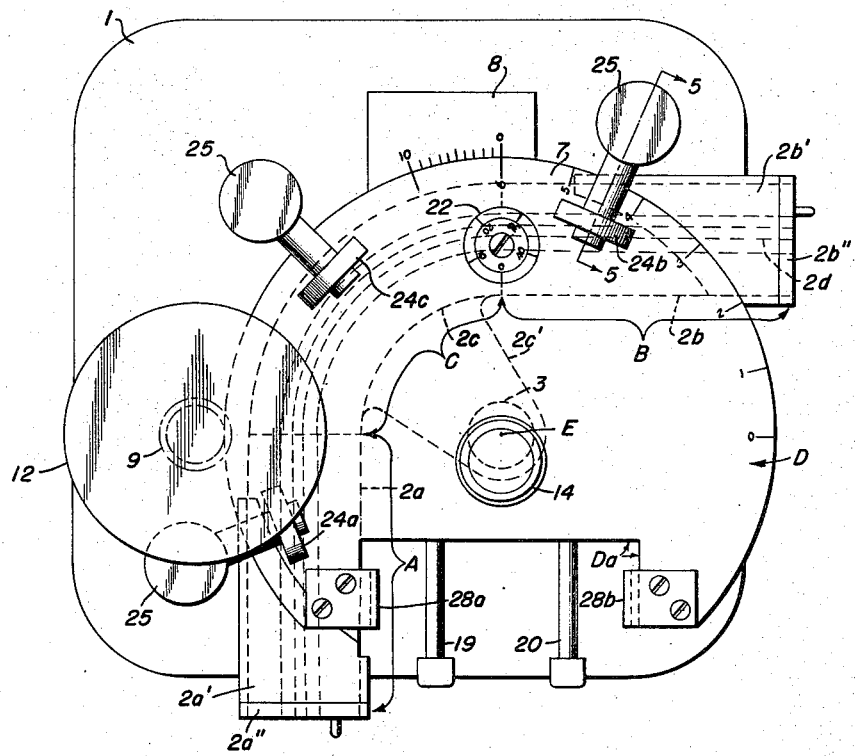
Figure 1 is a plan view of the indicator.
Figure 2:
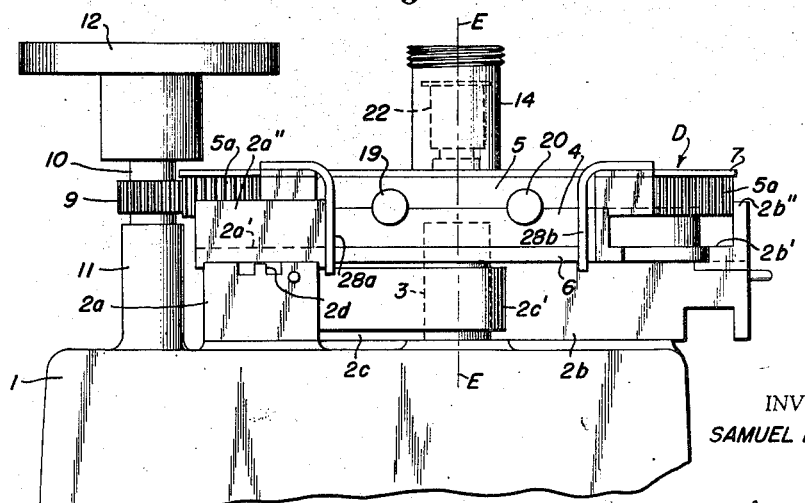
Figure 2 is an elevational view of Figure 1 as seen from the lower side of that figure, but with the presser rolls omitted for a clearer view of other features.
Figure 3:
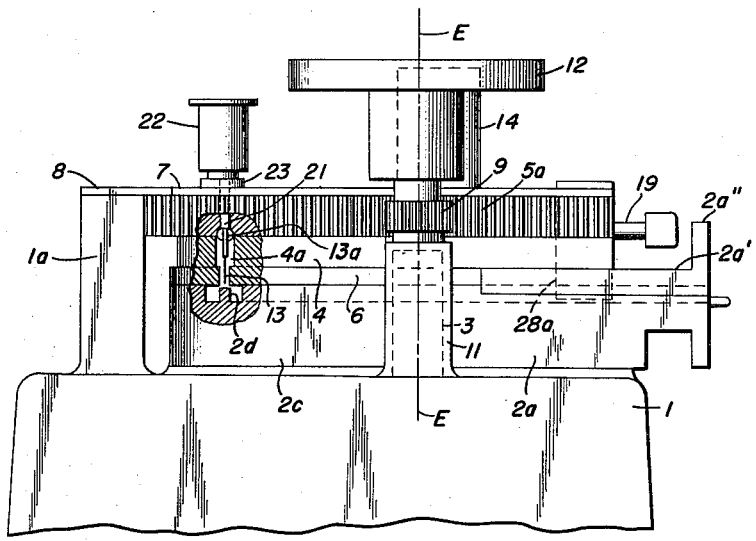
Figure 3 is a side elevation of Figure 1 but with the presser rolls omitted for a clearer view of other features.

Referring to Figures 1 to 3, the indicator comprises a base 1 supporting on its upper surface a section of rectangular waveguide bent about a vertical axis E extending parallel with the E-plane, the waveguide comprising two straight portions A and B and an intermediate curved portion C arranged in a circular arc about the axis E.

As shown in Figure 2, the waveguide is of the "ridged" type having a ridge 2d extending upwardly from the bottom wall at the center thereof. For convenience in construction, the two side walls, the ridge 2d and the bottom wall of the channel in the waveguide are formed in separate parts 2a, 2b, and 2c secured to the base 1, and the upper wall of the waveguide channel is formed of three removable cover pieces. Two of these cover pieces 2a', and 2b' are secured to end parts 2a and 2b, and the third cover piece is a circular cover plate or disk shown generally at D and mounted to rotate about the axis E. The cover plate D covers all of the center portion C of the waveguide and parts of end portions A and B, the adjacent edges of cover pieces 2a' and 2b' being formed in a circular arc to provide a close-fitting sliding joint between the two end cover pieces and the cover disk D. The center portion 2c of the waveguide is held in concentric relation with axis E by an inwardly extending arm 2c' having a bore which receives a vertical stud 3 mounted on base 1 concentric with the axis E.

The outer ends of the bent waveguide section are provided with suitable coupling flanges shown at 2a'' and 2b'' for coupling to other waveguide sections or devices.

The preferred construction for the cover plate D involves a composite construction consisting of a lower plate 4 and an upper plate 5 secured in face-to-face contact by suitable means. The lower plate 4 carries on its lower face a facing plate 6 formed of high conductivity metal such as coin silver, the plate 6 being suitably secured to the plate 4 as by sweating. The plate 6 has a smooth lower face which engages the upper faces of guide parts 2a, 2b and 2c and together with cover pieces 2a' and 2b', forms the upper wall surface of the waveguide channel in these parts. The upper plate 5 carries on its upper face a dial disk 7 provided with suitable graduations around its edge arranged to move past vernier graduations on a fixed vernier plate 8 carried upon a standard 1a extending up from the base 1. The cover plate D is journalled for rotation about the axis E by means of a counterbore formed in the plate 6 and extending into the plate 4 for receiving the upper end of the stud 3. The facing plate 6 is slightly larger in diameter than plate 4 and preferably is of substantially the same thickness as the cover pieces 2a' and 2b'. The adjacent edges of these cover pieces are formed in circular arcs which present cylindrical surfaces in close sliding contact with the cylindrical surface at the outer edge of the facing disk 6.

The upper plate 5 is of larger diameter than lower plate 4 and is provided with gear teeth 5a formed around its outer periphery. The composite cover plate D is rotated about the axis E by means of a pinion 9 engaging teeth 5a and carried by a shaft 10 journalled in standard 11 and being operated by a knob 12 on the upper end of shaft 10.

The lower plate 4 and the facing plate 6 are provided with a vertical bore 4a positioned directly above the ridge 2d (see Figure 3) through which the pick-up probe 13 extends into the channel of the waveguide. Probe 13 is formed of a fine wire supported at the end of the center conductor of a coaxial line embodied in the rotary plate D and connected to a suitable detector mounted in tubular casing 14 extending vertically from plate D near the center thereof. The upper end of casing 14 is adapted to connect the detector to a suitable circuit for indicating the value of the detected current or voltage.

Rotary cover plate D is provided with a rectangular notch D*a* in its edge portion located opposite the probe 13. Two channels 15 and 16 of circular section are formed partly in plate 4 and partly in plate 5, as by boring or milling. These channels are arranged parallel with each other and on opposite sides of the vertical plane which includes the probe 13 and the axis of detector casing 14, and both channels open through the bottom wall of the notch D*a*. These two channels are connected by a third channel 17 formed immediately below the detector casing 14. The inner end of channel 15 is connected with the vertical bore 4*a* for the probe 13 through a channel section 15*a*.

Figure 4:
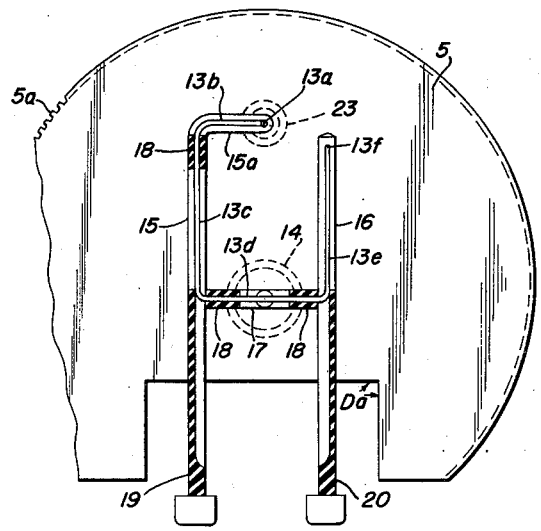
Figure 4 is a sectional view of the cover plate or movable wall section of the waveguide taken between the two plates forming this section.

The probe 13 is supported at the lower end of a vertical section 13*a* of the detector cable which in turn is supported by a horizontal section 13*b* located within channel 15*a*. The remaining parts of the center conductor of the coaxial cable include section 13*c* in channel 15 and section 13*d* in channel 17, the detector being connected to the mid point of section 13*d* by a vertical connection extending into the casing 14. Another cable section 13*e* connected to the end of 13*d* is arranged within channel 16 and is grounded to the plate D at 13*f* near the inner end of channel 16. The various sections of the cable conductor are supported by dielectric beads 18 as shown in Figure 4.

A tuning rod 19 formed of dielectric material is arranged to slide longitudinally within the channel 15 and is provided with a longitudinal slot for receiving the conductor section 13*c* so that the rod 19 may overlap a variable portion of conductor section 13*c*. A similar tuning rod 20 is mounted for sliding movement within the channel 16 and overlaps a variable portion of conductor section 13*e*.

The horizontal conductor section 13*b* is arranged so that its normal resilience tends to move the probe 13*d* vertically, but such movement is restrained by a push rod 21 arranged for vertical adjustment in a vertical bore formed in plate 5 directly above the probe 13. This push rod is formed of dielectric material and is supported from an adjusting knob 22 which has screw threaded engagement with a mounting collar 23 supported on plate D. Rotation of the knob 22 varies the amount of insertion of the probe into the channel of the waveguide.

Figure 5:
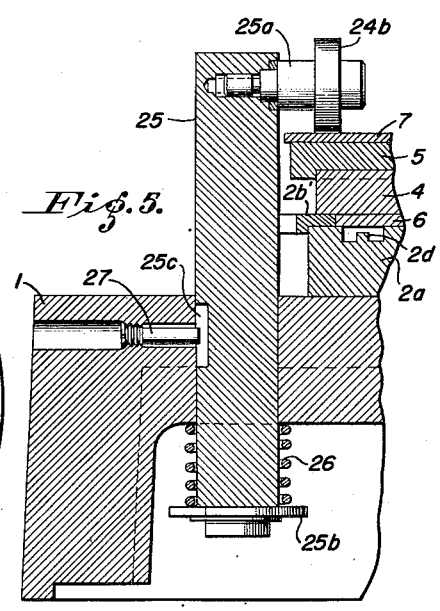
Figure 5 is a sectional view taken along the line 5—5 of Figure 1 showing the details of the presser roll mounting.

It is important that good electrical contact be maintained between the facing plate 6 and the upper surfaces of waveguide parts 2*a*, 2*b*, and 2*c*. For this purpose provision is made to apply pressure on the upper surface of rotary cover plate D at a number of points spaced around its outer edge portion. One suitable arrangement is shown in Figures 1 and 5 of the drawing and involves three ball-bearing rolls 24*a*, 24*b*, and 24*c* arranged to engage the upper surfaces of the cover plate D above the waveguide sections A, B, and C, respectively. These rollers are spring pressed against the cover plate D by a mounting arrangement illustrated in Figure 5. Each roll is supported upon a vertical post 25, passing through a vertical bore formed in the base 1, the roller being supported upon an inwardly extending arm 25'*a* at the upper end of the post. The lower end of the post 25 extends below the horizontal table portion of the base 1, and a compression spring 26 surrounds the lower end portion of the post between the table of the base and an abutment 25*b* on the lower end of the post. Spring 26 urges the post downwardly and thereby applies pressure to the rotary plate D through the roller mounted on arm 25*a*. The post 25 is held against rotation about its axis by means of a pin 27 threaded in a horizontal bore in the base 1 and extending into a vertical slot 25*c* formed in the post.

By the arrangement just described, proper contact is maintained between the rotary cover plate and both sides of the open face of the waveguide, and this is accomplished by pressure applied directly above different linear sections of the waveguide. This arrangement is more satisfactory than an arrangement which is designed to apply pressure at the center of the rotary cover plate.

In my arrangement, no pressure is applied at the center of the cover plate, and the plate is free to move along the axis of the pivot stud 3 to a position in which the plate is properly seated upon the walls of the waveguide.

Two arms 28*a* and 28*b* are secured to the top face of cover plate D and extend downwardly into opposite sides of the notch D*a* in positions to engage waveguide sections A and B respectively and thus limit the rotation of the cover plate D so that the probe 13 does not travel beyond the arcuate section C.

While the arcuate section C of the waveguide is shown and described as extending over a 90° arc, this section may extend over a smaller or a greater angle, depending on the radius of curvature. The important factor is that the arcuate portion of the waveguide should have a length of at least one guide wavelength at the lowest frequency of the operating band. For example, the arcuate section for a frequency band of 10 to 40 kmc. would have a length of from 2 to 2½ inches.

While my invention has been shown and described as applied to a ridged waveguide, it is clear that it may be applied to the conventional rectangular waveguide without a ridge.

I claim:

1. A device for exploring standing waves comprising a rectangular waveguide having a portion thereof arranged in a circular arc about an axis extending parallel with the shorter transverse dimension of said guide, one broad wall of said guide being cut away in the plane of the inner face thereof throughout said arcuate portion and along arcuate paths in the adjacent wall sections on opposite sides of said arcuate portion, a circular cover plate positioned to cover the open face of said waveguide and to rotate about said axis, the inner face of said rotary cover plate being in the same plane as the inner faces of said adjacent wall sections, and a probe mounted upon said cover plate and extending through an aperture in said cover plate opening into the channel of said waveguide.

2. A device according to claim 1 and including means acting upon said rotary cover plate, at points spaced about the peripheral portion thereof, for yieldably pressing said cover plate into engagement with said waveguide.

3. A device according to claim 1 and including a tubular detector casing mounted vertically upon said cover plate near the center thereof, and a coaxial line embodied in said cover plate connecting said probe and said detector casing.

4. A device according to claim 3 wherein said probe is supported upon a section of the center conductor of said coaxial line, said conductor section comprising a resilient support for said probe normally urging said probe out of said aperture, and an adjustable push-rod carried by said cover plate for moving said probe against the action of said conductor section.

5. A device according to claim 3 and including tuning means for varying the effective length of said coaxial line connecting said probe and said detector casing.

6. A device according to claim 1 and including a detector casing mounted upon said cover plate near the center thereof, a coaxial line connecting said probe and said detector casing, said coaxial line having a section thereof contained within a bore formed within said cover plate and opening through the outer edge of said plate, and a rod of dielectric material mounted for sliding within said bore to overlap a variable portion of said line section, said rod being slotted to receive the center conductor of said line section.

7. A device according to claim 6 and including a short-circuited coaxial line connected to said first-mentioned coaxial line at the junction with said detector casing, and means for varying the effective length of said short-circuited coaxial line.

No references cited.